Jan. 7, 1947.   R. G. AMES   2,413,684
PRESSURE PLASTIC APPLICATOR
Filed June 14, 1943   3 Sheets-Sheet 1
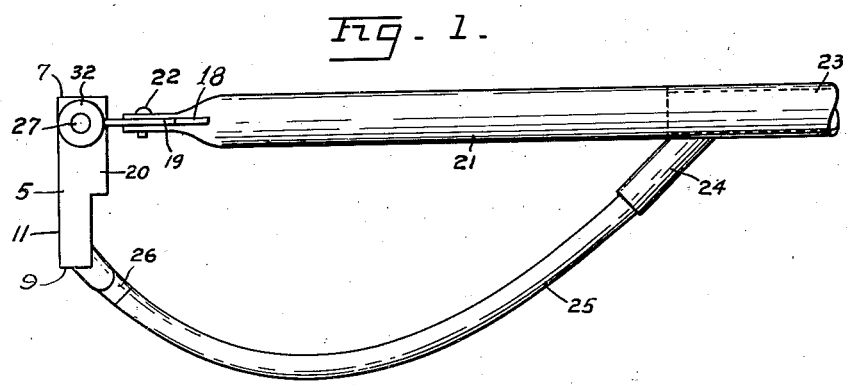
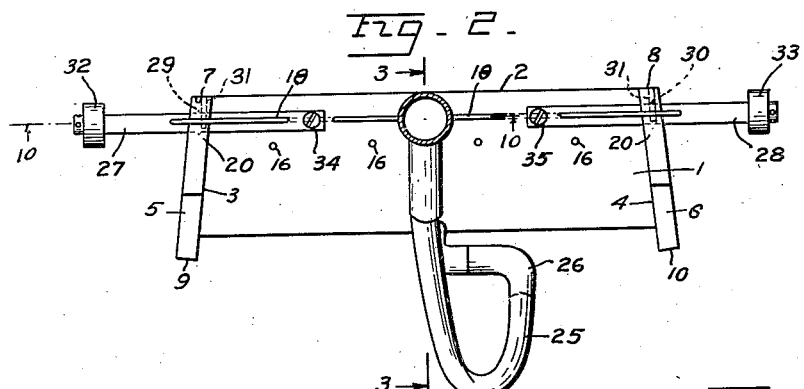
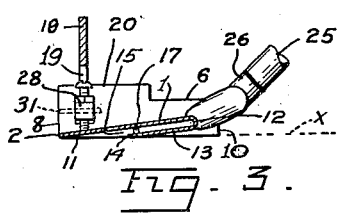
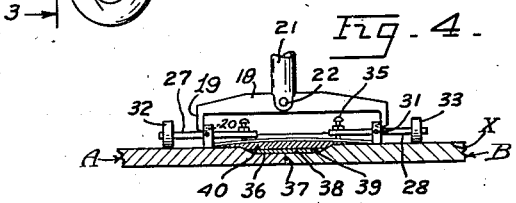
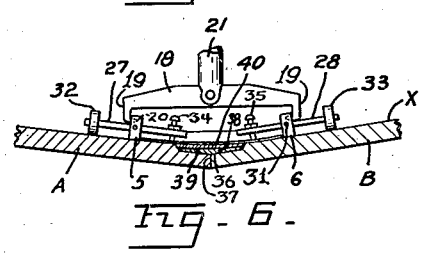
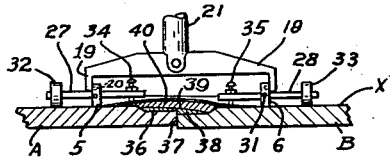
INVENTOR.
ROBERT G. AMES
BY
ATTORNEYS

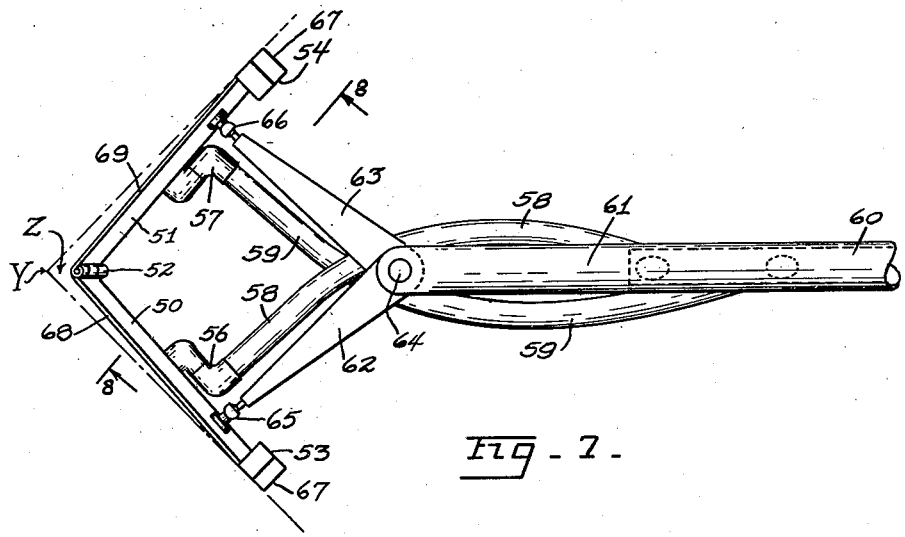
Fig. 7.
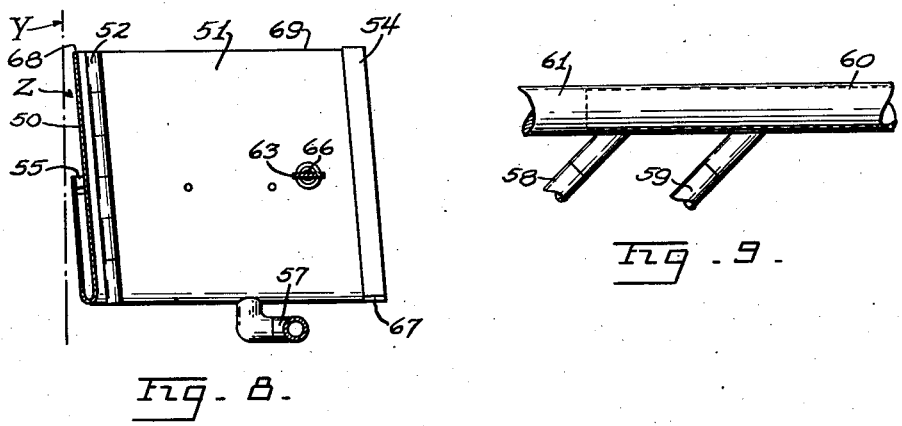
Fig. 8.
Fig. 9.
INVENTOR.
ROBERT G. AMES.
BY
ATTORNEYS

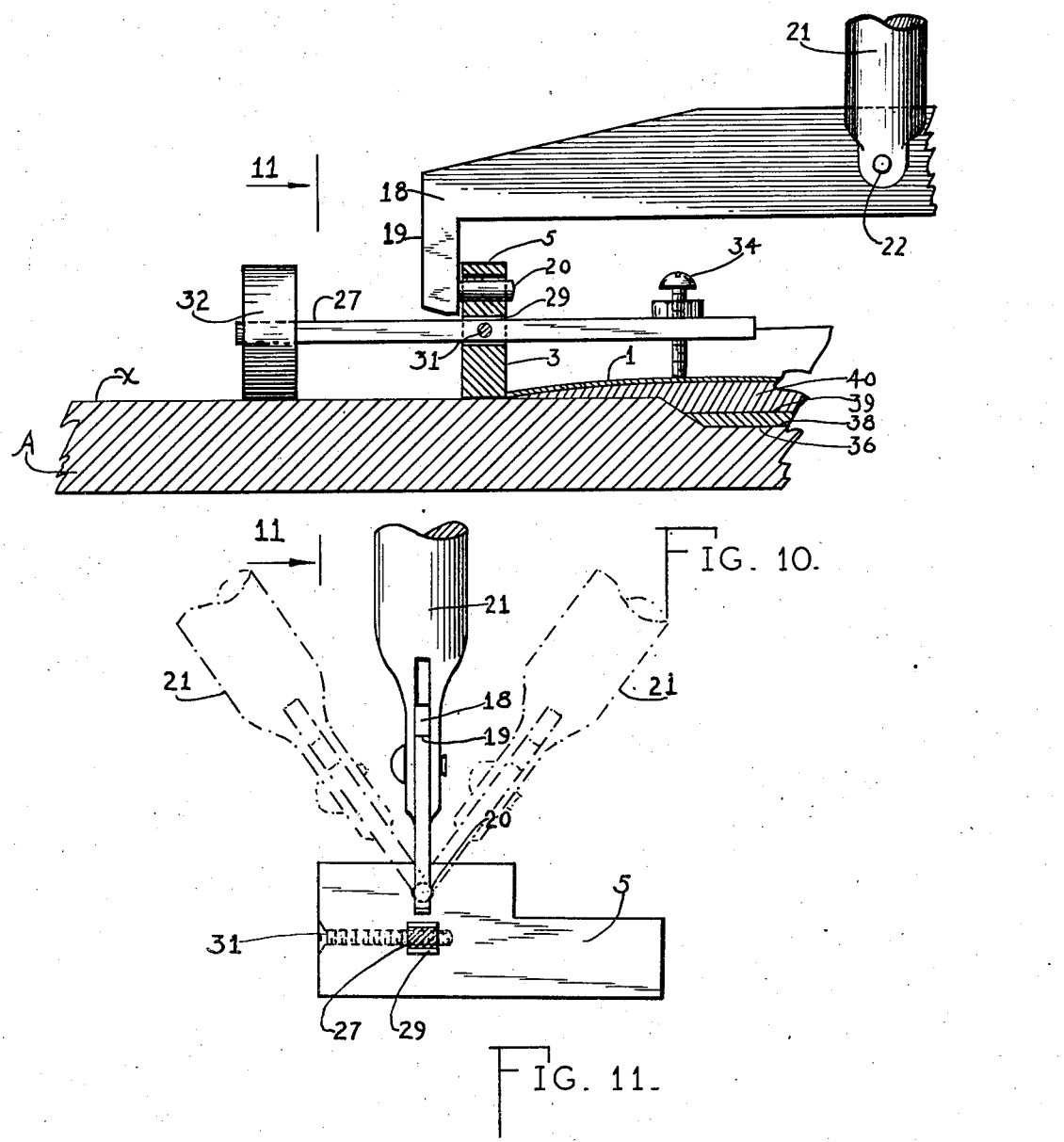

Patented Jan. 7, 1947

2,413,684

UNITED STATES PATENT OFFICE 2,413,684

PRESSURE PLASTIC APPLICATOR

Robert G. Ames, Burlingame, Calif., assignor of one-half to George W. Williams, and one-fourth to Stanley Ames, both of Burlingame, Calif.

Application June 14, 1943, Serial No. 490,948

5 Claims. (Cl. 72—130)

The present invention relates to improvements in a pressure plastic applicator, and it consists of the combinations, constructions and arrangements hereinafter described and claimed.

An object of my invention is to provide a pressure plastic applicator which is an improvement over the invention disclosed in my Patent No. 2,300,398. In the patent I show a flexible plate that has a mastic fed thereto, and this plate spreads the mastic over the tape in a wall board groove. The plate carries pivotal wings at its edges which are swingable into various angles with respect to the plate and permit the operator to vary the thickness of the layer of mud applied to the tape in the groove.

In the present device the structure is simplified in that the wings are rigidly secured to the plate edges and cause the plate to extend at a fixed angle to the wall board surface. The wings have their rearward ends inclined toward each other for a purpose hereinafter described. Novel means is used for delivering the mastic or mud throughout the length of a nozzle that is coextensive with the length of the plate. The size of the plate area that receives the "mud" determines the amount of pressure the mud will exert in flexing the plate so that the plate center will be spaced above the wall board surface the desired distance.

One of the principal objects of the invention is the use of what I term outriggers with the plate for causing it to be curved in the proper manner to accommodate itself to any irregularities in the wall board surface at the place where two sections join.

The device is also adapted to apply mud to an inner corner joint and a modified form of the invention for performing this function is illustrated in the drawings.

Other objects and advantages will appear in the following specification, and the novel features of the device will be particularly pointed out in the appended claims.

My invention is illustrated in the accompanying drawings forming a part of this application, in which:

Figure 1 is a side elevation of the device;

Figure 2 is a rear elevation;

Figure 3 is a section taken substantially along the line 3—3 of Figure 2;

Figures 4 to 6 inclusive are diagrammatic showings of the flexing of the plate to accommodate wall board sections that are slightly out of alignment with respect to each other;

Figure 7 is a top plan view of a modified form of the device;

Figure 8 is a section along the line 8—8 of Figure 7;

Figure 9 is a side elevation of a portion of the handle;

Figure 10 is an enlarged transverse section taken along the line 10—10 of Figure 2; and Figure 11 is a section taken along the line 11—11 of Figure 10.

While I have shown only the preferred form of my invention, it should be understood that various changes or modifications may be made within the scope of the appended claims without departing from the spirit of the invention.

In carrying out my invention I provide a flexible plate, indicated generally at 1, and this plate has a trailing edge 2 and side edges 3 and 4 that form obtuse angles with the trailing edge. Figure 2 illustrates the side edges as being welded to side wings 5 and 6. The wings are rectangular in shape, as shown in Figure 1, but their trailing ends 7 and 8 are disposed closer together than their leading ends 9 and 10.

Figure 3 illustrates the plate 1 as being inclined with respect to the wall board contacting edges 11 of the side wings 5 and 6. The angle made between the plate 1 and the edges 11 is slight with the trailing edge 2 of the plate lying flush with the edges 11 of the side wings and the front portion of the plate being spaced above the wall board surface X, see Figure 3. The same figure also illustrates the front edge of the plate as being folded at 12 with a lower spaced plate portion 13 extending from the fold or bend toward the trailing edge 2. The trailing edge 14 of the plate portion 13 cooperates with the plate 1 to form an elongated nozzle 15 that has a length coextensive with the length of the plate. Figures 2 and 3 disclose rivets 16 connecting the plate portion 13 to the body 1 and these rivets pass through spacing washers 17 for holding the edge 14 at a fixed distance from the plate 1.

It is best now to describe the means for supporting the plate 1 after which I will describe the means for conveying mud or mastic to the plate 1. In Figures 2 and 3 I show a U-shaped member 18 that extends across the length of the plate 1 and has its ends 19 pivotally mounted in bearings 20 provided in the wings 5 and 6. The member 18 is free to pivot in the bearings 20 so that the plate can rock about a longitudinal axis that extends through the two bearings 20. A handle 21 is pivoted to the center of the member 18 at 22 so that the handle can swing at right angles to the swinging movement of the member 18. In this way the plate can swing into various angular positions with respect to the handle.

The handle has a hollow portion 23 through which mud under pressure is fed from a pressure tank and hose, not shown, but of the type disclosed in my Patent No. 2,300,398. A branch pipe 24 leads from the hollow portion 23 and in turn communicates with a flexible conduit 25 that leads to a swivelled pipe 26 carried by the plate 1. The swivelled pipe communicates with the interior of the nozzle 15, see Figure 3, to deliver mud thereto under pressure. The swivel pipe 26 and the flexible conduit 25 permit the plate 1 to assume various angular positions.

I have found that wall board sections are not always disposed in the same plane when they are secured to supporting wall members. Sometimes the sections extend at a slight angle with respect to each other making either a concave or convex angle, and sometimes they are offset. I provide novel means for flexing the plate 1 to accommodate the plate 1 to the different irregularities in wall board section joints. This means automatically curves the plate so that its edges will provide feathered edges to the layer of mud. I pivotally mount what I term outriggers 27 and 28 in openings 29 and 30 provided in the wings 5 and 6. The outriggers are elongated members and are pivoted at 31 in the openings, see Figure 3. The outriggers have their pivotal axes extending at right angles to the axes of the bearings 20 and the members 27 and 28 project an appreciable distance inwardly from the edges of the plate 1 and also extend a similar distance beyond the wings 5 and 6. Rollers 32 and 33 are rotatably mounted at the outer ends of the outriggers 27 and 28. At the inner ends of the outriggers I mount adjustable screws 34 and 35 that are adapted to bear against the plate 1 at points inwardly removed from the wings 5 and 6.

From the foregoing description of the various parts of the device, the operation thereof may be readily understood.

When the device is used for applying mud to a joint where the wall board sections are in alignment with each other, the outriggers do not function to flex the plate 1. Figure 4 illustrates two wall board sections A and B that are in alignment with each other and have a groove 36 that extends across the joint 37. The usual practice is to apply a layer of mud 38 to the bottom of the groove 36 and cover this with a strip of tape 39. The top of the tape and the remainder of the groove is covered with a second layer of mud 40 that is applied by the present device. The pressure of the mastic is sufficient to flex the plate 1 in the manner shown in Figure 4 so that a slight crown is provided. The sides of the plate curve toward the surface X of the wall board so that the crowned upper layer of mud will have feathered edges that merge into the wall board surface.

The curve in the plate 1 is exaggerated for purposes of clarity in the diagrammatic view of Figure 4. In actual practice the center of the trailing plate edge will be spaced about one sixteenth of an inch above the wall board surface while the ends of the plate edge will contact with the surface to make a feathered edge for the mud layer. The curvature of the trailing edge of the plate is caused by the pressure of the mastic and this pressure is in turn controlled by several factors, namely, the pressure applied to the mastic in the receptacle, not shown, the length and size of the conduit leading from the receptacle to the hollow handle 23, the length and width of the nozzle opening 15, and the size of the area of the undersurface of the plate 1 disposed between the edge 14 and the trailing edge 2.

In Figure 5 I illustrate how the outriggers will form a double curve in the plate 1 when the wall boards A and B are offset. The offsetting of the wall boards is also exaggerated and so likewise is the curvature of the plate 1. The operator in pressing the device against the wall board surface by means of the handle 21 causes the wings 5 and 6 to ride on the surfaces of the two wall board sections. The outrigger 28 has its roller 33 riding on the wall board B, the surface of the board B being depressed with respect to the surface of the wall board A. The result is that the roller 33 will cause the screw 35 to press on the plate 1 to curve the portion of the plate adjacent to the wing 6 in an opposite direction to the normal curve of the plate. This opposite or concave curve will feather the edge of the second layer of mud 40 so that it will merge into the surface X of the wall board section B. The opposite side of the plate 1 will have a convex curve in the normal manner. The double curvature of the plate 1 will continue so long as the two wall boards remain offset one to the other.

In Figure 6 I show an exaggerated condition where the two wall boards A and B extend at a slight concave angle to each other. Here the outriggers 27 and 28 with their rollers 32 and 33 will bear against the wall board surfaces and will cause the screws 34 and 35 to press the plate 1 into a concave shape throughout its entire length rather than into a convex shape. There is a loose fit in the bearings 20 which will permit the side wings 5 and 6 to swing in the manner shown. The plate will form the layer of mud 40 with feathered edges that merge into the surface X even though this surface is slightly concave. If the two wall board sections A and B form a convex angle, the device will take the shape as illustrated in Figure 4 except that the convex curvature in the plate 1 will be more pronounced.

It will be seen from this that the outriggers only come into play when there are irregularities in the wall board sections that produce either an offset condition or a concave angle. They automatically form the plate 1 into a double curvature or into a concave curve. The fold or bend 12 at the leading edge of the plate 1 does not prevent the trailing edge 2 from taking these various shapes.

The inclined wings 5 and 6 shown in Figure 2 cause any excess mud that might be forced around the leading ends 9 and 10 of the wings to be spaced from the feathered edges of the mud formed by the device. This spacing of the excess mud from the feathered edges of the mud layer permits the operator to remove the excess mud without marring the feathered edges.

In Figures 7 to 9 inclusive, I show a modified form of pressure plastic applicator especially designed to apply mud to an interior corner, indicated generally at Y in Figure 7. The tool comprises two plates 50 and 51 connected together by a piano hinge 52, see Figure 8. The free edge of the plate 50 carries a side wing 53 while the free edge of the plate 51 carries a side wing 54. The side wings 53 and 54 are similar to the wings 5 and 6 and serve a similar purpose.

Each plate 50 and 51 has a mud outlet nozzle 55 similar to the nozzle 15. Swivelled pipes 56 and 57 convey mud to the nozzles under pressure. Flexible conduits 58 and 59 connect the swivelled pipes 56 and 57 with a hollow portion 60 of a handle 61. The manner of connecting the flexible conduits with the hollow handle portion 60 is illustrated in Figure 9. Sufficient play is provided in the flexible conduits to permit the plates 50 and 51 to swing into various angles.

The plates 50 and 51 are connected to the handle 61 by links 62 and 63 that are pivoted to the handle at 64 and have ball and socket joint connection with the plates 50 and 51 at 65 and 66 respectively. The length of the links 62 and 63 and the distance from the ball and socket joints 65 and 66 to the piano hinge 52 is such as to cause pressure on the handle 61 to create a moment of force that will tend to move the hinge and plates down into the corner Y. This movement is counteracted to a certain extent by the pressure of the mud against the plates 50 and 51 so in reality a space will be provided between the hinge and the corner to receive the mud. The size of this space Z shown in Figure 7 is exaggerated for clarity.

Figure 8 discloses how the piano hinge will be inclined slightly to the vertex of the corner Y. The wings 53 and 54 are inclined so that their forward ends 67 will space any excess mud flowing therearound, away from the feathered mud edges made by the juncture of the trailing plate edges 68 and 69 with their respective side wings 53 and 54.

In using this form of the invention, the handle 61 is grasped so as to move the tool along the corner Y. Mud under pressure will be applied to the corner. The plates will determine the thickness of the mud layer at the corner Y and the same plates will feather the edges of the mud so that the surface of the mud layer will merge into the surface of the wall. The thickness of the mud layer can be regulated by the pressure applied to the handle while using the tool and to the pressure of the mud fed to the nozzles 55. The outriggers 27 and 28 are not used with this form of the invention.

I claim:

1. A pressure plastic applicator comprising a flexible plate having a trailing edge, means for feeding a mastic under pressure to the edge, a handle for supporting the plate while moving the latter over a wall board groove for causing the plate to apply the mastic in the groove, the pressure of the mastic causing the plate to curve slightly so that the center of the plate is spaced away from a plane coinciding with the aligned wall board surface sections disposed adjacent to the groove, and outriggers pivotally connected to the plate and projecting beyond the plate sides for contacting with the wall board surfaces, the inner ends of the outriggers overlying the plate and bending it into an opposite curve when the outer surfaces of the wall board sections make a concave angle and swing the outer ends of the outriggers above the plate and the inner ends against the plate, whereby said opposite plate curve will feather the edges of the mastic layer so that they will merge into the planes of the wall board sections.

2. In a pressure plastic applicator, a flexible plate having a trailing edge, means for feeding a mastic under pressure to the edge, outriggers pivotally mounted at the sides of the plate and having their outer ends projecting beyond the plate sides and carrying rollers for contacting with the wall board surfaces, and adjustable screws carried by the inner ends of the outriggers and contacting with the plate, said rollers when contacting two adjacent wall board surfaces forming a concave angle therebetween moving said screws for curving the plate so that the plate sides will feather the mastic layer edges so that they will merge into the planes of the wall board sections.

3. In a pressure plastic applicator, a flexible plate having a trailing edge, means for feeding a mastic under pressure to the plate for forming a slight curve to the edge when the plate applies the mastic to a wall board groove, the curve spacing the plate center a greater distance away from the groove bottom, outriggers pivotally mounted at the sides of the plate and having their outer ends projecting beyond the plate sides and carrying rollers, adjustable screws carried by the inner ends of the outriggers, said screws normally contacting with the plate and said rollers contacting with the wall board surfaces disposed adjacent to the groove, the rollers when contacting wall board surfaces that are off-set at the groove causing the screws to flex the plate trailing edge into reverse curves for feathering the mastic layer edges so that they will merge into the outer surfaces of the wall board sections.

4. In a pressure plastic applicator, a flexible plate in the shape of an isosceles trapezoid with the smaller parallel side of the trapezoid constituting the trailing edge, wings secured to the sides of the plate and having their front under surfaces lying flush with the trailing edge, the plate being inclined so that its front edge is disposed a slight distance above the wing undersurfaces, a nozzle disposed on the underside of the plate and extending between the wings, the nozzle outlet paralleling the trailing edge and being spaced between the trailing and leading edges, means for feeding a mastic under pressure to the nozzle, the rear ends of the wings being disposed nearer to each other than the forward ends, whereby when the wings contact with a wall board surface while the device is applying mastic in a wall board groove, any excess mastic that might flow around the front ends of the wings will be spaced from the edges of the mastic layer applied to the groove, thus permitting the excess mastic to be removed without marring the edges of the mastic layer.

5. In a pressure plastic applicator, a plate having a trailing flexible edge, wings secured to the sides of the plate and having their under surfaces lying flush with the trailing edge, said plate being inclined with respect to the undersurfaces of the wings so that the front edge is spaced from the wing undersurfaces, a longitudinal nozzle disposed on the underside of the plate and extending parallel with the trailing edge and being spaced therefrom, the area of the plate disposed between the nozzle and the trailing edge being adapted to receive mud from the nozzle, and means for feeding a mud under pressure to the nozzle, the pressure of the mud causing the central portion of the plate to be spaced a sufficient distance from the wall surface for applying a layer of mud thereto.

ROBERT G. AMES.